(12) United States Patent
Villaume et al.

(10) Patent No.: US 8,140,257 B2
(45) Date of Patent: Mar. 20, 2012

(54) METHOD AND DEVICE FOR GENERATING A TAXIING TRAJECTORY FOR AN AIRCRAFT

(75) Inventors: Fabrice Villaume, Seysses (FR); Pierre Scacchi, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 649 days.

(21) Appl. No.: 12/330,355

(22) Filed: Dec. 8, 2008

(65) Prior Publication Data
US 2009/0150068 A1 Jun. 11, 2009

(30) Foreign Application Priority Data

Dec. 11, 2007 (FR) ..................................... 07 08597

(51) Int. Cl.
*G01C 21/00* (2006.01)

(52) U.S. Cl. .................. 701/206; 701/3; 701/7; 701/13; 701/120; 701/121; 701/210; 340/945; 340/958; 340/961; 382/104; 382/106

(58) Field of Classification Search .............. 701/3, 121, 701/13, 7, 210, 120, 206; 340/961, 945, 340/958; 382/104, 106
See application file for complete search history.

(56) References Cited

U.S. PATENT DOCUMENTS

| | | | | |
|---|---|---|---|---|
| 6,100,964 | A | * | 8/2000 | De Cremiers ................ 356/4.01 |
| 6,249,740 | B1 | | 6/2001 | Ito |
| 7,772,992 | B2 | * | 8/2010 | Fetzmann et al. ............ 340/961 |
| 7,974,773 | B1 | * | 7/2011 | Krenz et al. .................. 701/120 |
| 2006/0015247 | A1 | * | 1/2006 | Speer ........................... 701/206 |

FOREIGN PATENT DOCUMENTS

| | | |
|---|---|---|
| DE | 43 04 562 | 8/1994 |
| EP | 1 096 231 | 5/2001 |
| EP | 1 471 329 | 10/2004 |

OTHER PUBLICATIONS

Preliminary Search Report dated Jul. 1, 2008 w/ English translation.

* cited by examiner

*Primary Examiner* — Yogesh C Garg
(74) *Attorney, Agent, or Firm* — Dickinson Wright PLLC

(57) ABSTRACT

Disclosed is a method and device for generating an aircraft ground path for piloting an aircraft along the ground of an airport domain. Geographical coordinates of reference points corresponding to a series of elements of the airport domain that the aircraft is to successively follow are obtained and converted to a metric frame. Points of intersection of the successive elements are then determined, as well as an auxiliary path for the aircraft to follow, based on the converted geographical coordinates. A turn at each of the intersection points is next determined, and the aircraft ground path is generated from each of the determined turns.

10 Claims, 5 Drawing Sheets

METHOD AND DEVICE FOR GENERATING A TAXIING TRAJECTORY FOR AN AIRCRAFT

FIELD OF THE INVENTION

The present invention relates to a method and a device for generating a trajectory intended for the ground rolling of an aircraft.

BACKGROUND OF THE INVENTION

The present invention applies to the rolling of an aircraft on the ground, in particular an airplane, civil or military, for transporting passengers or merchandise (freight), or else a drone (pilotless aircraft). It relates, more particularly, to the generation of a ground trajectory, which is such that the aircraft can be guided, manually or automatically, along this trajectory on an airport domain such as an aerodrome or an airport.

Within the framework of the present invention, the following meanings are implied:
- "rolling on the ground" implies any type of possible rolling of an aircraft, such as rolling on a landing runway in the course of the landing and takeoff phases, or rolling on trafficways or on maneuvering areas, in particular;
- "ground trajectory" implies the path followed by the aircraft on the airport domain, including in particular the takeoff and landing runways, the trafficways or taxiways, the turn-around areas, the waiting zones, the stop bars, the stopping positions (stand), the maneuvering areas, and the parking areas; and
- "automatic guidance" implies the action of a device forming an integral part of the aircraft and capable of ensuring, partially or totally, that is to say without aid or with the partial aid of a human, the driving of an aircraft on the ground.

Currently, the (human) pilot controls the lateral movements of the aircraft on the ground with the aid of manual piloting facilities (for example a steering wheel allowing the orientation of the wheel of the front landing gear or a direction rudder bar), along a ground trajectory. These facilities make it possible to control actuators capable of influencing the lateral movements of the aircraft, in particular by way of the orientation of the wheel of the front landing gear (and optionally the orientation of the rear gear), of the rudder of the fin, and of the asymmetric use of the brakes and engines.

The ground trajectory is generally provided to the pilot, for example by way of radiocommunication means or some other standard means such as a digital data transmission link, by an air traffic controller or a ground controller, but it can also, in certain cases, be chosen freely by the pilot.

The trajectory is defined in the form of a succession of elements of the airport domain, and indicates a path making it possible to attain, from one point or region of the airport domain, another point or region of said domain.

Any portion of the domain, whether or not designated by a name, and identified as a distinct and delimited part of the domain, is called an element of the airport domain. An element may optionally overlap one or more others. The takeoff and landing runways, the trafficways or taxiways, the turn-around areas, the waiting zones, the stop bars, the stopping positions (stand), the maneuvering areas and the parking areas are in particular designated as elements.

Knowing the ground trajectory to be followed, the pilot acts on the piloting facilities, so as to control the movements of the aircraft on the ground (the longitudinal speed and the lateral displacements of the aircraft). He does so also in order to follow the trajectory in such a way that all the parts of the aircraft in contact with the ground (the wheels of the front and rear gear) remain permanently on the pavement designed for aircraft rolling. For most airports accommodating civil or military transport airplanes, the term "ground" implies the parts covered with tarmac and designed for this purpose. The pilot's objective is therefore to manage a trajectory so that none of the parts of the aircraft in contact with the ground lies at a given moment on a portion of the airport domain that is not designed for the rolling of the aircraft, in particular portions covered with grass, earth or sand, or portions designed solely for the rolling of lighter vehicles (cars, trucks).

Currently, the pilot has only a map (paper or displayed by computer by an appropriate viewing system in the cockpit) and instructions from the air/ground traffic control describing the trajectory to be followed, so as to guide the aircraft manually from one point to another of the airport domain.

Consequently, in the absence of a representation of the trajectory to be followed utilizable by the computerized systems of the aircraft:
- the trajectory tracking lateral guidance cannot be carried out automatically by a device of the aircraft;
- the pilot cannot have a visual representation of the trajectory (for example on a display system of the aircraft) which would enable it to aid him to guide the aircraft manually following the lateral axis; and
- this guidance presents a very significant workload.

SUMMARY OF THE INVENTION

The object of the present invention is to remedy the aforesaid drawbacks. It relates to a method making it possible to generate a trajectory intended for the ground rolling of an aircraft, in particular a transport airplane, on an airport domain.

For this purpose, according to the invention, said method is noteworthy in that:
a) a path is received, comprising a series of elements of the airport domain that the aircraft must follow successively, an element representing a distinct and delimited portion of the airport domain and being characterized by at least two reference points which represent fixed points of said airport domain;
b) the geographical coordinates of the reference points corresponding to the elements of said path that the aircraft must follow are extracted automatically from a set of reference points of the airport domain;
c) the geographical coordinates thus extracted are automatically transposed into a metric frame tied to the airport domain;
d) the set of points of intersection of the successive elements of said path which are such that, when they are connected together successively, they form an auxiliary trajectory, is determined automatically on the basis of said coordinates thus transposed;
e) said auxiliary trajectory is shaped automatically, at least by determining a turn at each of said intersection points, so as to generate said trajectory intended for the ground rolling of the aircraft; and
f) this trajectory is provided to at least one user system.

Thus, by virtue of the invention, a trajectory which can be followed by the aircraft when it must travel along the aforesaid path while rolling on the ground is generated. This trajectory can, in particular, be provided to a user system such as an automatic piloting system which enables the aircraft to be made to follow, in an automatic manner, this ground trajectory. The latter can also be provided to a user system such as a display system able to generate a visual representation of this trajectory on an appropriate viewing means, this visual representation possibly being used by the pilot to aid him to guide the aircraft, by lateral piloting, manually along said ground trajectory.

Within the framework of the present invention, the expression "reference point of the airport domain" is understood to mean a fixed point of the domain, whose geographical position is known precisely, perfectly, and whose definition and characteristics are common to the aircraft and to the air/ground traffic control, and a set of which makes it possible to represent in an unambiguous and schematic manner the essential and sufficient characteristics of the elements of the airport domain so as to allow, in particular, automatic piloting of an aircraft on the ground. Each element of the airport domain is characterized by at least two reference points, forming a broken line (succession of straight line segments connected together). The set of these reference points forms a network covering all or some of the airport domain.

Moreover, preferably, each element (of the airport domain) is typed, that is to say it is characterized, in addition to the coordinates of its reference points, by at least one additional item of information making it possible to differentiate between the elements, for example the type of each element. By way of example, the elements can be characterized by the following types: "runway", "taxiway", "parking", "stand" (stand bars), "stop" (stop bars), "maneuver" (turn-around area for example), "waypoint", and "fast exit" (taxiway adjoining a runway and making it possible to clear the latter at high speed).

Additionally, in an advantageous manner, in step e), a check is carried out on said trajectory to verify that each turn exhibits a maximum curvature which is less than a predetermined threshold curvature, so as to avoid overly tight turns that the aircraft would not be able to follow.

In a preferred embodiment, said trajectory is formed of a succession of turns and of straight line segments, and each turn is a circular arc whose radius depends on the segments arriving at the corresponding intersection point. In this case, preferably, said trajectory is defined in the form of a succession of cubic Bezier curves, the cubic Bezier curves being able (in a standard manner) to define turns and straight line segments.

Furthermore, in an advantageous manner, in step d), a check is carried out, for each intersection point, to verify that the angle formed by two segments arriving at this intersection point is less than a predetermined threshold value, so as to avoid constructing overly short turns or turn-back points.

Additionally, in a particular embodiment, in step e):
all the artifacts existing on the auxiliary trajectory are deleted. Within the framework of the present invention, an artifact is an anomaly appearing during the construction of a turn, when two intersection points are too close to leave room for two turns separated by a segment. The consequence of this anomaly is the appearance of two turn-back points at the level of the segment situated between these turns; and/or
a concatenation of the segments of said auxiliary trajectory is carried out, if appropriate. If, in the auxiliary trajectory, several successive elements are straight line segments, these straight line segments are aligned (otherwise they would be separated by turns). In this case, it is possible to simplify the trajectory, by concatenating these successive straight line segments into a single straight line segment.

Furthermore, advantageously, in step f), said trajectory is provided in the form of a table which lists the successive elements of the trajectory, and which presents, for each of these elements:
a first characteristic sign (comprising for example longitude and latitude values) which makes it possible to define its position in the trajectory;
a second characteristic sign making it possible to characterize it, for example by indicating its type such as aforesaid;
its length; and
its maximum curvature.

Such a presentation of the trajectory enables it to be made more consistent and more easily utilizable by user systems of the aircraft.

Consequently, by virtue of the invention, and as specified further below:
a representation of the ground trajectory to be followed is available, which is utilizable by several systems of the aircraft;
this ground trajectory can serve as support for the generation of an associated speed profile suited to the latter;
this ground trajectory allows the implementation of automatic or semi-automatic guidance of the aircraft following the lateral axis;
this ground trajectory can be suited to the particular characteristics of the aircraft, in particular to its longitudinal wheelbase; and
this ground trajectory makes it possible to provide the pilot with a visual representation of the trajectory to be followed, so as for example to aid him during lateral guidance of the aircraft in manual mode.

The present invention also relates to a device for generating a trajectory intended for the ground rolling of an aircraft, in particular of a civil or military transport airplane, on an airport domain.

According to the invention, said device is noteworthy in that it comprises:
means for receiving a path comprising a series of elements of the airport domain that the aircraft must follow successively, an element representing a distinct and delimited portion of the airport domain and being characterized by at least two reference points which represent fixed points of said airport domain;
means for automatically extracting from a set of reference points of the airport domain the geographical coordinates of the reference points corresponding to the elements of said path that the aircraft must follow;
means for automatically transposing the geographical coordinates thus extracted into a metric frame tied to the airport domain;
means for automatically determining, on the basis of said coordinates thus transposed, the set of points of intersection of the successive elements of said path which are such that, when they are connected together successively, they form an auxiliary trajectory;
means for automatically shaping said auxiliary trajectory, at least by determining a turn at each of said intersection points, so as to generate said trajectory intended for the ground rolling of the aircraft; and
means for providing this trajectory to at least one user system.

The present invention also relates to an aircraft, in particular a transport airplane, which is furnished with a device such as that aforesaid.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
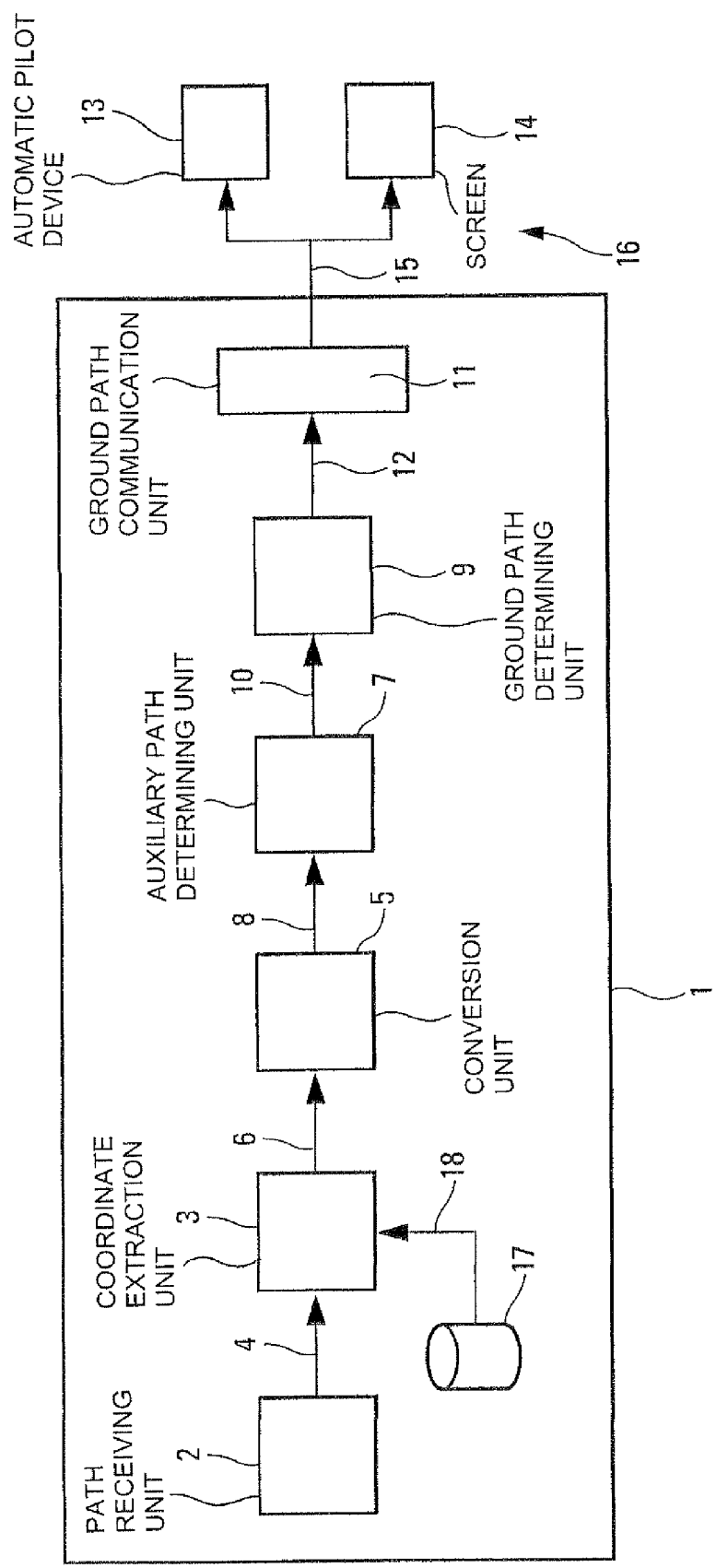
FIG. 1 is the schematic diagram of a trajectory generation device in accordance with the invention.

The device 1 in accordance with the invention and represented schematically in FIG. 1, is formed so as to generate a trajectory which is intended for the ground rolling of an aircraft, in particular a transport airplane, not represented. This device 1 relates to the generation of a ground trajectory, which is such that the aircraft can be guided, manually or automatically, along this trajectory on an airport domain such as an aerodrome or an airport. This ground trajectory therefore represents a path to be followed by the aircraft on the airport domain, including in particular the takeoff and landing runways, the trafficways or taxiways, the turn-around areas, the waiting zones, the stop bars, the stopping positions (stand), the maneuvering areas, and the parking areas.

According to the invention, said device 1 comprises:

- means 2 for receiving a path comprising a series of elements of the airport domain that the aircraft must follow successively. An element of the airport domain represents a distinct and delimited portion of said airport domain and is characterized by at least two reference points which represent fixed points of said airport domain;
- means 3 which are connected by way of a link 4 to said means 2 and which are intended to extract from a set of reference points of the airport domain the geographical coordinates of the reference points corresponding to the elements of said path (transmitted by the means 2) that the aircraft must follow;
- means 5 which are connected by way of a link 6 to said means 3 and which are intended to transpose the geographical coordinates (extracted by said means 3), into a metric frame tied to the airport domain;
- means 7 which are connected by way of a link 8 to said means 5 and which are formed so as to determine, on the basis of the coordinates thus transposed, the set of points of intersection of the successive elements of said path. These intersection points are such that, when they are connected together successively, they form an auxiliary trajectory;
- means 9 which are connected by way of a link 10 to said means 7 and which are intended to shape said auxiliary trajectory (received from said means 7), at least by determining a turn at each of said intersection points, so as to generate said trajectory which is intended for the ground rolling of the aircraft; and
- means 11 which are connected by way of a link 12 to said means 9 and which are able to provide the trajectory determined by said means 9 to user systems 13 and 14 by way of a link 15.

Said trajectory can be defined in various ways. In particular, several families (or combinations of families) of curves can be used to form this trajectory. By way of illustration:

- in a first variant, the trajectory constructed by the device 1 is formed solely of straight line segments connected one after the other, so as to form a curve of broken lines, each turn (or any other curved element) being made up of several segments, whose number depends on a desired approximation;
- in a second variant, the trajectory constructed by the device 1 is formed of a combination of segments and of circular arcs (or of elliptic arcs);
- in a third variant, the trajectory constructed by the device 1 is formed of a combination of segments and of clothoids;
- in a fourth variant, the trajectory constructed by the device 1 is formed of a combination of segments and of NURBS ("Non-Uniform Rational B-splines"), in particular of "B-splines"; and
- in a fifth variant (the particular case of the fourth variant), the trajectory constructed by the device 1 is formed of a succession of polynomial curves, for example splines, in particular Bezier curves [quadratic (of degree 2), cubic (of degree 3), or of any higher degree].

A particular case of this fifth variant constitutes a preferred variant embodiment which will be described below: the trajectory constructed is formed of a succession of cubic Bezier curves. A trajectory formed of a combination of straight line segments and of Bezier curves comes into this preferred variant, since a straight line segment can be described by a Bezier curve (of any degree greater than or equal to 2).

In a particular embodiment, said device 1 and said user systems 13 and 14, in particular means for aiding piloting, specified below, form part of a system 16 for aiding the piloting of an aircraft rolling on the ground on an airport domain.

Consequently, by virtue of the device 1 in accordance with the invention, and as specified further below:

- a representation of the ground trajectory to be followed is available, which is utilizable by several systems 13, 14 of the aircraft;
- this ground trajectory can serve as support for the generation of an associated speed profile suited to the latter;
- this ground trajectory allows the implementation of automatic or semi-automatic guidance of the aircraft following the lateral axis;
- this ground trajectory can be suited to the particular characteristics of the aircraft, in particular to its longitudinal wheelbase; and
- this ground trajectory makes it possible to provide the pilot with a visual representation of the trajectory to be followed, so as for example to aid him during lateral guidance of the aircraft in manual mode.

In a particular embodiment, said means 2 can be:

- input means, for example a keyboard, allowing an operator, in particular the pilot of the aircraft, to input said path into the device 1; and/or
- communication means making it possible to receive automatically, in a standard manner, from outside the aircraft, and in particular from an air traffic controller or a ground controller, said path, for example with the aid of a data transmission link.

Additionally, said means 3 extract said reference points for example from a database 17 (via a link 18). This database 17 can be situated:

- either at the level of the aircraft and represent an onboard database, as shown in FIG. 1;
- or outside the aircraft and represent a database whose reference points are communicated to said means 3 by standard communication means (not represented).

Consequently, on the basis of a path provided for example by the air traffic controller or the ground controller, in the form, in particular, of a series of names of elements of the airport domain to be followed successively, or in any other form describing the course to be followed, doing so whatever means of communication is used between the controller and the aircraft, in particular by audio between the controller and the pilot, or by any computerized means between the controller and the aircraft (for example by data transmission link), and on the basis of reference points of the airport domain, or any other means of representing in one way or another the constituent elements of the airport domain, said device 1 generates a trajectory which is utilizable by one or more computerized systems of the aircraft, so as to allow, for example:

- automatic lateral guidance of the aircraft, in particular with the aid of an automatic piloting device 13; or
- visual aid to the manual guidance of the aircraft in lateral mode, in particular with the aid of a screen 14 able to display a visual representation of the trajectory (determined by the device 1).

Within the framework of the present invention, the expression "reference point PX of the airport domain" is understood to mean a fixed point of the domain, whose geographical position is known precisely, perfectly, and whose definition and characteristics are common to the aircraft and to the air/ground traffic control, and a set of which makes it possible to represent in an unambiguous and schematic manner the essential and sufficient characteristics of the elements of the airport domain so as to allow, in particular, the automatic piloting of the aircraft on the ground. Each element of the airport domain is characterized by at least two reference points, forming a broken line (succession of straight line segments connected together), such as for example the element Ei-1 of FIG. 2 which is characterized by reference points Pi-1A and Pi-1B. The set of these reference points forms a network covering all or some of the airport domain.

Moreover, preferably, each element Ei (of the airport domain) is typed, that is to say it is characterized, in addition to the coordinates of its reference points, by at least one additional item of information making it possible to differentiate between the elements, for example the type of each element. By way of example, the elements can be arranged in the following categories of type: "runway", "taxiway", "parking", "stand" (stand bars), "stop" (stop bars), "maneuver" (turn-around area for example), "waypoint", and "fast exit" (taxiway adjoining a runway and making it possible to clear the latter at high speed).

The table below presents a possible procedure for constructing the various aforesaid trajectory elements.

| Type | Construction | Remarks |
| --- | --- | --- |
| Runway | Defined by two points, at the ends of the runway and aligned with the axis of the runway. | A runway that can be taken in either direction constitutes two distinct objects, geometrically the same, but the order of whose characteristic points is reversed. It is an oriented element. |
| Taxiway | Defined by N points, with one point per segment end. For an arbitrary path, or for a turn that cannot be constructed in an automatic manner (non-standard turning radius), two points must not be separated by more than an angular gap of 30°. | Basic element of the construction of the network of reference points of the airport. Can be traversed in either direction. |
| Oriented taxiway | Path defined in the same manner as the objects of "Taxiway" type. The order of the points defines the direction of orientation of the taxiway. | Taxiway that can be followed in one direction only. Serves for particular cases (for example, for a one-way circular lane). |
| Fast exit lane | Path defined in the same manner as the objects of "Taxiway" type. | Differs from a taxiway by a larger turning radius at the level of the turn between the lane and the runway. |
| Maneuver | Path defined in the same manner as the objects of "Taxiway" type. | General path making it possible to carry out particular maneuvers, for example using a turn-around area or a waiting area. Differs from a taxiway by a lower regulatory speed (10 knots maximum) and a shorter turning radius. |
| Parking | Path defined in the same manner as the objects of "Taxiway" type. | The parking area can be traversed in either direction, the orientation being defined by the presence of the stand. |
| Stop | Constructed by two points on each side of a taxiway, defining a segment perpendicular to the axis of the lane. | Segment used to define a stopping point on a taxiway. |
| Stand | Defined in the same manner as the objects of "Stop" type. | Identical to a stop, but used specifically to mark stoppage on a parking area. |
| Waypoint | Defined in the same manner as the objects of "Stop" type. | |

In a preferred embodiment, the means 3 extract from the database 17 comprising the set of reference points, the information relating to the trajectory elements pertinent to said path. For example, if the path passes through elements E1, E2, etc. En, n being an arbitrary integer, the means 3 extract from the database 17 the geographical coordinates of the reference points characterizing these elements E1 to En, as well as the type of each of said elements E1 to En.

The geographical coordinates of the reference points are thereafter converted by the means 5 into an orthonormal metric frame local to the airport domain. In a particular variant, it is assumed that the coordinates are initially expressed (in particular in the database 17) in the international system of coordinates WGS84, in [degrees, minutes, seconds].

[A, B, C] and [D, E, F] respectively denote the longitude and the latitude of a reference point PX of the airport domain, expressed in degrees, minutes and seconds:

$$\begin{cases} D°E'F'' \text{ of latitude N} \\ A°B'C'' \text{ of longitude E} \end{cases}$$

Likewise, [Aref, Bref, Cref] and [Dref, Eref, Fref] respectively denote the longitude and the latitude of the origin PO of the frame (for example, a reference point, or any other point, notable or otherwise, in the neighborhood of the airport domain), also expressed in degrees, minutes and seconds.

For the South latitudes and the West longitudes, the triplets are respectively negative.

In the metric orthonormal frame local to the airport domain and centered on the chosen point PO, the coordinates Xp and Yp of a reference point PX may be written:

$$\begin{cases} Xp = \dfrac{3600(A - Aref) + 60(B - Bref) + (C - Cref)}{3600} \cdot \dfrac{2\pi}{360} \cdot \sqrt{\dfrac{a^2 b^2}{b^2 + a^2 \tan(\alpha 0)^2}} \\ Yp = \dfrac{3600(D - Dref) + 60(E - Eref) + (F - Fref)}{3600} \cdot \dfrac{\pi(a + b)}{360} \end{cases}$$

in which expressions:
α0 is the latitude of the origin PO of the frame;
tan is the tangent;
a is the semi major-axis of the earth; and
b is the semi minor-axis of the earth.

Additionally, the means 7 establish, on the basis of the reference points of the elements of the path, a list L1 containing the set of points of intersection of the successive elements of the trajectory. Specifically, the trajectory to be followed does not necessarily follow the whole of each element. Typically, this is in particular the case when:
during landing, the aircraft must exit the runway by a taxiway situated midway between the runway ends; or
a very long taxiway is intersected by several other taxiways.

The means 7 therefore determine the set of intersection points which, connected together successively, will constitute the trajectory actually followed by the aircraft. Accordingly:
the element Ei of the list of trajectory elements is considered successively, up to the penultimate one in the list;
each element possibly being made up of several segments, the segment Sj of the element Ei and the segment Sk of the next element Ei+1 are considered;
one then seeks to determine whether the segments Sj and Sk intersect and:
if they do, the intersection constitutes a waypoint, and one recommences by considering the elements Ei+1 and Ei+2; and
otherwise, iteration is carried out over j and k until an intersection is found; and
if no intersection is found at the end of iteration, the pathway considered is not valid. The trajectory generation stops and the pathway must be redefined correctly by the air/ground traffic control or the pilot.

Figure 2:
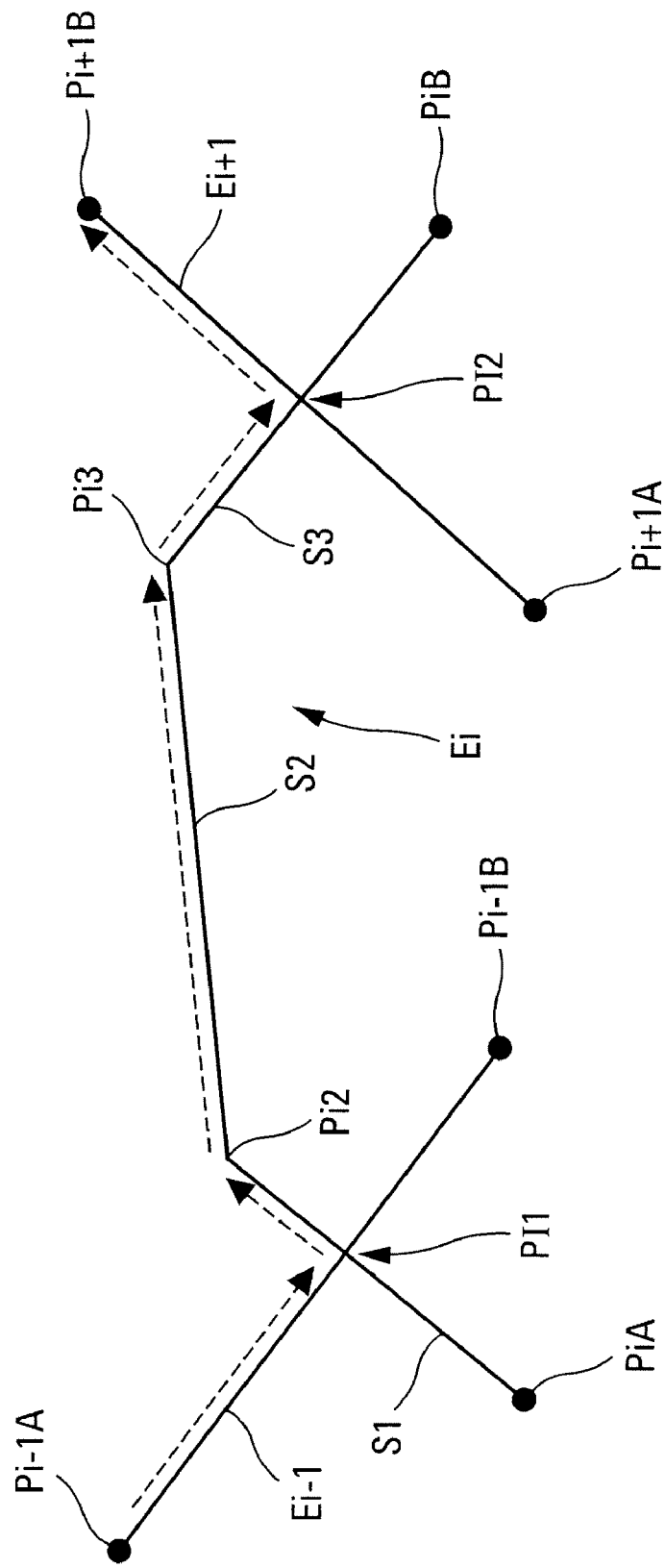
FIGS. 2 to 4 are graphics making it possible to explain the determination of points of intersection of successive elements of a path to be followed.

If an intersected element Ei consists of several segments S1, S2 and S3, the set of intermediate points Pi2 and Pi3 situated between the two intersection points Pl1 and Pl2 of the element Ei constitute waypoints, and must be added to the list L1 in order, as represented in FIG. 2. In this FIG. 2, the element Ei (defined between PiA and PiB) possesses three segments S1, S2 and S3. The first segment S1 is intersected by the element Ei−1 (defined between Pi−1A and Pi−1B), and the last segment S3 is intersected by the element Ei+1 (defined between Pi+1A and Pi+1B). The successive waypoints (following the dashed line) are therefore, in order:
Pi−1A (reference point), Pl1 (intersection point), Pi2 (intermediate point), Pi3 (intermediate point), Pl2 (intersection point), Pi+1B (reference point).

If an intersection point coincides with an intermediate point (that is to say if an element Ei is intersected at the level of an articulation), a single point must be input into the list L1, otherwise a doubleton appears.

Figure 3:
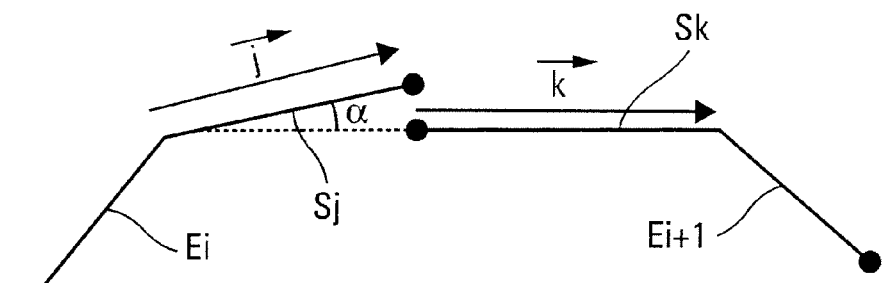

Additionally, it will be noted that the intersection of two segments is meaningless if the latter are aligned. This case is therefore checked, before determining an intersection point between two segments Sj and Sk. For this purpose, one begins by calculating the angle α formed by the two segments Sj and Sk considered, as represented in FIG. 3, with the aid of the following expression:

$$\alpha = \arccos\left( \dfrac{|jx \cdot kx + jy \cdot ky|}{\|\vec{j}\| \cdot \|\vec{k}\|} \right),$$

in which:
$\vec{j}$ and $\vec{k}$ are direction vectors of the segments Sj and Sk which form part of two successive elements Ei and Ei+1;
$\vec{j}$ and $\vec{k}$ have coordinates (jx, jy) and (kx, ky); and
arccos is the inverse of the cosine.

If the angle α is less than a threshold value ∈, the two segments Sj and Sk are considered to be aligned (that is to say to have the same direction).

Moreover, if the corresponding vectors $\vec{j}$ and $\vec{k}$ are collinear, the lateral gap which separates them is determined. If this lateral gap is below a threshold, the segments Sj and Sk are considered to follow one another. Otherwise, the segments Sj and Sk are considered to be too far apart to constitute a valid pathway.

Furthermore, if the two ends coincide, only a single point is added to the list (to avoid doubletons), otherwise both are added.

It will be noted that the segments are oriented in an arbitrary manner, that is to say the order of the points defining the elements can occur in both directions of travel of the element (except for the runways, which are oriented elements). Consequently, which segment ends are to be considered is not known a priori. It is therefore necessary to calculate the four possible distances separating the ends pairwise, and to choose as ends to be considered those which form the shortest distance.

Figure 4:
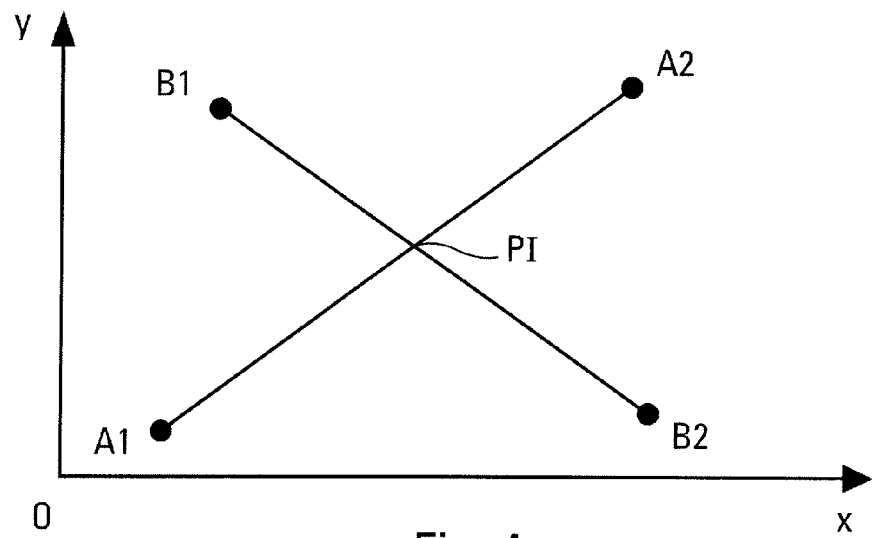

Additionally, concerning the intersection of two segments, one seeks to determine whether two segments intersect, and if they do, at which point. Each segment is viewed as a linear Bezier curve defined by its two ends (see FIG. 4 which shows an intersection of two linear Bezier curves: A1A2 and B1B2, in a plane Oxy), and parametrized by s∈[0,1]. If sA∉[0,1] or if sB ∉[0,1], then the two segments do not intersect.

It being possible for a segment end to be situated in the neighborhood of another segment (at the level of a T' junction for example), a tolerance is fixed, for example 5% of the length of the segment considered, except in the case where one of the elements is a stand, a stop or a waypoint, in which case the tolerance is zero (since it is certain that the two elements intersect). The intersection condition is then:
sA∈[−0.05; 1.05] and sB∈[−0.05; 1.05]
with:

$$\begin{cases} sA = \dfrac{A1x(B2y - B1y) + B1x(A1y - B2y) + B2x(B1y - A1y)}{A1x(B2y - B1y) + A2x(B1y - B2y) +} \\ \qquad\qquad B2x(A2y - A1y) + B1x(A1y - A2y) \\ sB = \dfrac{-(A1x(B1y - A2y) + A2x(A1y - B1y) + B1x(A2y - A1y))}{A1x(B2y - B1y) + A2x(B1y - B2y) + B2x(A2y - A1y) +} \\ \qquad\qquad B1x(A1y - A2y) \end{cases}$$

In these expressions, the pairs (A1x, A1y), (B1x, B1y), (A2x, A2y) and (B2x, B2y) are respectively the coordinates of the points A1, B1, A2, B2 in the plane Oxy.

The coordinates of the intersection point Pl are given by:

$$Pl = A1(1-sA) + A2sA = B1(1-sB) + B2sB.$$

Additionally, it is known that at the start of the trajectory, the choice of the first point constitutes an ambiguity. Consequently, the first element of the trajectory must be, either a runway (since it is an oriented element) in the case of a landing, or a stand, a stop or a waypoint in the general case.

Likewise, at the end of the trajectory, the last intersected element also constitutes an ambiguity, since there is no next element to determine the direction of travel. Consequently, the trajectory must terminate, either in a runway in the case of takeoff, or in a stand, a stop or a waypoint in the general case, so as to determine the final point of the trajectory.

Additionally, once the intersection points have been determined, the means 7 (or the means 9) check that no angle formed by two successive segments is greater than a fixed threshold αthresh, so as to avoid constructing overly short turns or turn-back points.

Furthermore, the means 7 (or the means 9) check that the list L1 thus finalized does not include any doubletons, which must be deleted if appropriate. Two successive points with the same coordinates and of the same type are called a doubleton. A doubleton can appear if one element intersects another at the level of an elbow, for example.

Additionally, with a view to constructing the turns, each waypoint is typed, that is to say it possesses an information cue of the type "Runway", "Taxi", "Parking", etc., as specified above. A list L2 is therefore constructed, at the same time as the list L1, possessing as many elements as the list L1, and containing the type information for each waypoint. More particularly:
- if it is an intermediate point, the type is that of the corresponding element;
- if it is an intersection point, the type is ambiguous if the two intersected elements are of different types. An arbitrary choice is then made to give the intersection point the next element's type; and
- if the point arises from an intersection with a stand, a stop or a waypoint, it takes the latter's type.

The trajectory being defined by a list of waypoints to be attained successively in a straight line, the next step (implemented by the means 9) consists in constructing a turn at each waypoint, so as to obtain a trajectory such that, a point of the aircraft (for example the mid-point of the main gear) following this line, all the wheels of the aircraft remain on the pavement of the runway with the largest possible margin with respect to the edges.

The general idea consists in alternating turns and straight line segments, both types of shapes being described by cubic Bezier curves (connected together). Each "exit" end of a curve corresponds to the "entrance" end of the following curve (the ends are superimposed), and the tangents to the connection points are aligned (no break point).

Mathematically, a cubic Bezier curve is defined by four points {A, B, C, D}, is parametrized by the parameter $s \in [0, 1]$, and has the equation:

$$Z(s) = A(1-s)^3 + 3B(1-s)^2 s + 3C(1-s)s^2 + Ds^3$$

Figure 5:
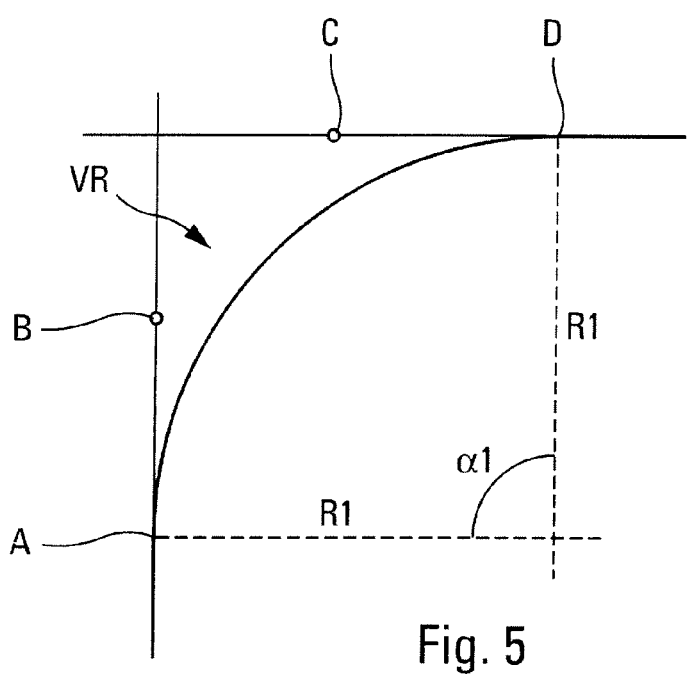
FIGS. 5 and 6 are graphics making it possible to explain a turn determination procedure, in accordance with the invention.

The points A and D are the ends of the curve. The points B and C are control points, whose position determines the form of the curve, as represented in FIG. 5.

The procedure for constructing a turn VR is defined by the following relations:

$$\|\overrightarrow{AB}\| = \|\overrightarrow{CD}\| = R1 f(\alpha 1)$$

$$f(\alpha 1) = 0.001188 \alpha 1^3 - 0.01283 \alpha 1^2 + 0.34139 \alpha 1$$

in which:
- R1 is the radius of the turn VR; and
- α1 is the aperture angle of the turn VR.

It may be necessary to modify the shape of the turn so as to maximize the gap between the wheels and the runway edges. The shape of the turn is then adjusted by way of two weighting factors: Pe and Ps relating respectively to the entrance and to the exit of the turn, so that:

$$\begin{cases} \|\overrightarrow{AB}\| = R1 \cdot Pe \cdot f(\alpha 1) \\ \|\overrightarrow{CD}\| = R1 \cdot Ps \cdot f(\alpha 1) \end{cases}$$

The turns are therefore circular arcs whose radius varies according to the type of each of the segments articulated around the waypoint considered.

Figure 6:
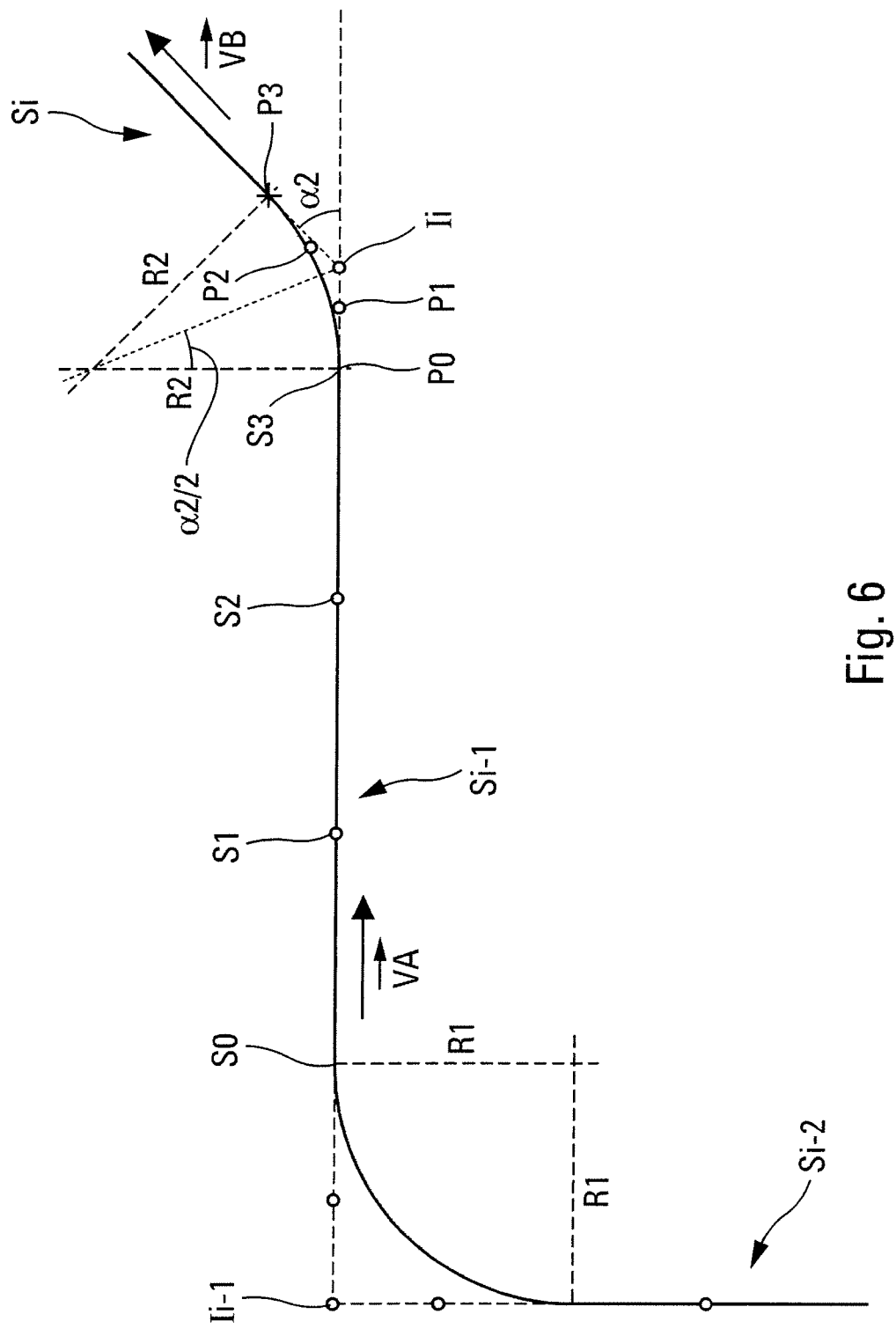

The calculation of the turns is carried out in the following manner by the means 9:
- at each waypoint Ii, they consider the segments Si−1 and Si on either side of this point Ii, such as are represented in FIG. 6 for example. The means 9 calculate a unit direction vector for each of these segments:

$$\overrightarrow{VA} = \frac{\overrightarrow{Ii-1 \cdot Ii}}{\|\overrightarrow{Ii-1 \cdot Ii}\|} \text{ and } \overrightarrow{VB} = \frac{\overrightarrow{Ii \cdot Ii+1}}{\|\overrightarrow{Ii \cdot Ii+1}\|}$$

next they calculate the angle α2 formed by the two segments Si−1 and Si: α2=arccos (VAx.VBx+VAy.VBy), arccos being the inverse of the cosine, and (VAx, VAy) and (VBx, VBy) being the coordinates of the vectors $\overrightarrow{VA}$ and $\overrightarrow{VB}$ respectively;

they go to the start of the segment preceding the waypoint Ii considered, i.e. a point S0. At each iteration, as they go along they construct the Bezier curve corresponding to the segment, as well as that corresponding to the turn around the waypoint, i.e. eight points to be determined: S0, S1, S2, S3, P0, P1, P2, P3, such as represented in FIG. 6;

they calculate the ends P0 and P3 of the turn:

$$\begin{cases} P0 = Ii - R2 \cdot \tan(\alpha 2 / 2) \cdot \overrightarrow{VA} \\ P3 = Ii - R2 \cdot \tan(\alpha 2 / 2) \cdot \overrightarrow{VB} \end{cases}$$

they calculate control points P1 and P2 of the turn (the weightings depend on the radius of the turn):

$$\begin{cases} P1 = P0 + R2 \cdot Pe \cdot f(\alpha 2) \cdot \overrightarrow{VA} \\ P2 = P3 - R2 \cdot Ps \cdot f(\alpha 2) \cdot \overrightarrow{VB} \end{cases}$$

they calculate the ends of the segment, S0 being the entrance end of the segment: it is also the exit of the previous turn, hence:

$$S0i = P3i - 1$$

$$S3 = P0i$$

they calculate control points S1 and S2 of the segment Si−1 (distributed at constant distance along this segment Si−1):

$$\begin{cases} S1 = S0 + (d/3)\overrightarrow{VA} \\ S2 = S3 - (d/3)\overrightarrow{VA} \end{cases}$$

with $d = \|\overrightarrow{S0S3}\|$

Once all the turns have been created, the means 9 terminate the list by constructing the last segment. S0 is the entrance end of this last segment: it is also the exit of the last turn, hence:
S0$i$=P3$i$−1;
S3 is the last waypoint; and
S1 and S2 are defined by the above calculation.

Furthermore, if the point considered is of "stand", "stop" or "waypoint" type, the means 9 do not construct a turn (only a stopping point or waypoint is involved). To retain a description that is homogeneous with the previous notation, a segment of zero length is then created:

$$S0=S1=S2=S3.$$

Additionally, the means 9 comprise means (not represented) for checking on the trajectory (thus obtained) that each turn exhibits a maximum curvature which is less than a predetermined threshold curvature, so as to avoid overly tight turns that the aircraft would not be able to follow.

Figure 7:
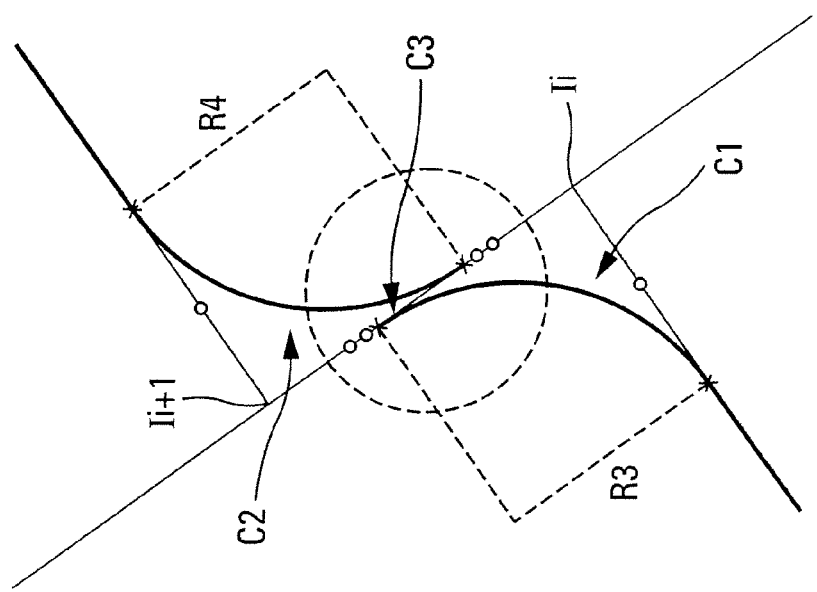

Additionally, said means 9 also comprise means (not represented) for deleting all the artifacts existing on the trajectory. Within the framework of the present invention, an artifact is an anomaly appearing during the construction of a turn, when two intersection points are too close to leave room for two turns C1 and C2 separated by a segment, as represented in FIG. 7. The consequence of this anomaly is the appearance of two turn-back points at the level of the segment C3 situated between these turns.

Figure 8:
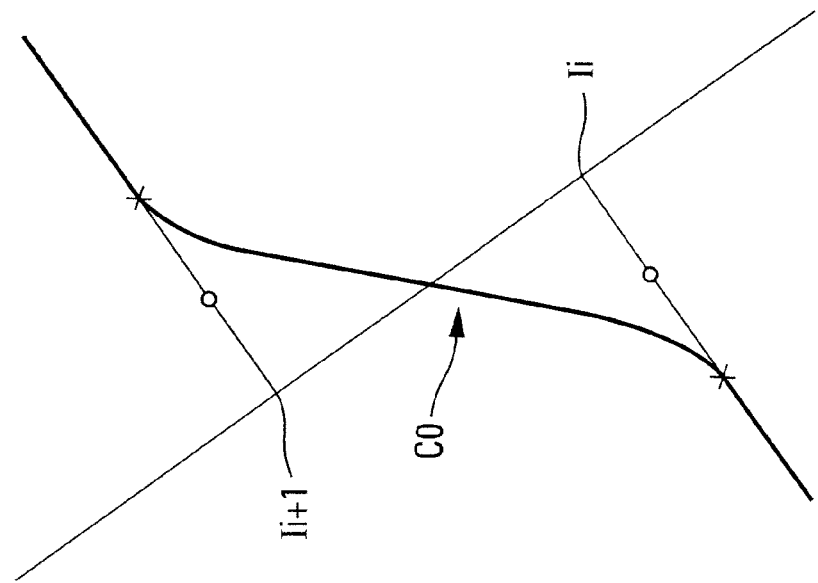
FIGS. 7 and 8 are graphics making it possible to portray a deletion of artifacts on a trajectory.

Accordingly, the means 9 merge the three Bezier curves C1, C2 and C3 (namely the two turns C1 and C2 and the central segment C3) into a single curve C0, defined by the first end and the first control point, as well as by the last end and the last control point, as represented in FIG. 8. Specifically, the four extreme points are kept and all the intermediate points are deleted.

The artifacts can be corrected:
either when creating the turns. In this case, the condition for the appearance of the anomaly is $\|I1.Ii+1\| < R3+R4$, that is to say if the gap between the two waypoints is less than the sum of the radii of the two turns;
or subsequently, when the list of Bezier curves is supplemented. In this case, it is possible to detect the artifact by calculating the scalar product of the direction vector of the central segment and of the vector $\overrightarrow{Ii.Ii+1}$. If this scalar product is negative, the two segments are oppositely directed, thereby revealing an abnormal situation.

Additionally, the means 9 also comprise means (not represented) which are able to carry out, if appropriate, a concatenation of the segments of said trajectory. If, in the trajectory, several successive elements are straight line segments, these straight line segments are aligned (otherwise they would be separated by turns). In this case, it is possible to simplify the trajectory, by concatenating these successive straight line segments into a single straight line segment.

Additionally, in a particular embodiment, said means 9 comprise checking means (not represented) for checking, with the aid of a series of criteria, that the trajectory constructed is valid. This validation does not make it possible to deduce therefrom that the trajectory correctly follows the requested path, but gives guarantees relating to the fact that the form of the trajectory is such that the latter can serve as support for guidance of the aircraft, in particular that it is continuous, without break points or turn-back points.

More particularly, these checking means of the means 9 can carry out, in particular, the following checks:
check that the numbering of the Bezier curves is correct;
check that the Bezier curves are connected successively to one another, for example by checking that the point A (FIG. 5) of each curve is superimposed on the point D of the previous curve;
check that, for each of the Bezier curves, the control handles are not of zero length, that is to say the points B and C are not superimposed, respectively, on the points A and D. It is necessary to exclude from this test the stopping points (stands and stops) as well as the waypoints, whose four points A, B, C and D are superimposed;
in order to avoid break points between two Bezier curves, check that the control handle $\overrightarrow{ABi}$ of a curve Si is aligned with the control handle $\overrightarrow{CDi-1}$ of the previous curve Si−1, by checking that the angle formed by the two vectors does not exceed a given threshold angle;
in order to avoid turn-back points between two Bezier curves, check that the control handle $\overrightarrow{ABi}$ of a curve Si is oriented in the same sense as the control handle $\overrightarrow{CDi-1}$ of the previous curve Si−1, by checking that:

$$\overrightarrow{ABi}.\overrightarrow{CDi-1} > 0$$

If this scalar product is negative, the control handles form a turn-back point; and
in order to avoid overly tight turns which the aircraft will not be able to follow, check that each curve possesses a maximum curvature which is less than a given threshold curvature, by calculating the curvature of the Bezier curve at a particular number of points and by comparing it with said threshold curvature.

Additionally, said means 11 provide, preferably, said trajectory in the form of a table which lists the successive elements of the trajectory, and which presents, for each of these elements:
at least one first characteristic sign (for example latitude and longitude values) making it possible to define its position in the trajectory;
at least one second characteristic sign (for example a name) making it possible to characterize it, by indicating in particular its type;
its length; and
its maximum curvature.

Such a presentation of the trajectory enables it to be made more consistent and more easily utilizable by user systems 13, 14 of the aircraft.

The invention claimed is:
1. A method of generating an aircraft ground path for piloting an aircraft along the ground of an airport domain, the method comprising the steps of:
a) receiving, by a path receiving unit in the aircraft, a path defined by a series of elements of the airport domain, which elements the aircraft is to successively follow, with each element being comprised of at least two reference points which represent fixed geographical points of said airport domain;

b) obtaining, by a coordinate extraction unit, the geographical coordinates of the reference points that correspond to the elements of said path that the aircraft is to follow;

c) converting, by a conversion unit, the obtained geographical coordinates into a metric frame tied to the airport domain;

d) determining, by an auxiliary path determining unit, points of intersection of the successive elements of said path and determining an auxiliary path for the aircraft to follow, based on the converted geographical coordinates;

e) determining a turn, by a ground path determining unit, at each of said intersection points, and generating from each of the determined turns said aircraft ground path; and f) providing, by a ground path communication unit, the generated aircraft ground path to at least one user system.

2. The method as claimed in claim 1,
wherein in step e), a check is carried out on said generated aircraft ground path to verify that each turn exhibits a maximum curvature which is less than a predetermined threshold curvature.

3. The method as claimed in claim 1,
wherein said generated aircraft ground path is formed of a succession of turns and of straight line segments, and in that each turn is a circular arc whose radius depends on the segments arriving at the corresponding intersection point.

4. The method as claimed in claim 1,
wherein said generated aircraft ground path is defined in the form of a succession of cubic Bezier curves, the cubic Bezier curves defining turns and straight line segments.

5. The method as claimed in claim 1,
wherein in step d), a check is carried out, for each intersection point, to verify that the angle formed by two segments arriving at the corresponding intersection point is less than a predetermined threshold value.

6. The method as claimed in claim 1,
wherein in step e), artifacts existing on the auxiliary path are deleted.

7. The method as claimed in claim 2,
wherein in step e), the maximum curvature and the length of each element of the auxiliary path which is defined in the form of a succession of elements are determined.

8. The method as claimed in claim 1,
wherein in step e), a concatenation of the segments of said auxiliary path is carried out.

9. The method as claimed in claim 1,
wherein in step f), said generated aircraft ground path is provided in the form of a table which lists the successive elements of the generated aircraft ground path, and which presents, for each of these elements, a first characteristic sign defining a position in the generated aircraft ground path, and a second characteristic sign defining length, and maximum curvature of the generated aircraft ground path.

10. A device for generating an aircraft ground path for piloting an aircraft along the ground of an airport domain, the device comprising:

path receiving unit that receives a path defined by a series of elements of the airport domain, which elements the aircraft is to successively follow, with each element being comprised of at least two reference points which represent fixed geographical points of said airport domain;

coordinate extraction unit that obtains the geographical coordinates of the reference points from the path receiving unit that correspond to the elements of said path that the aircraft is to successively follow;

conversion unit that converts the obtained geographical coordinates into a metric frame tied to the airport domain;

auxiliary path determining unit that determines, based on said converted geographical coordinates, points of intersection of the successive elements of said path and which determines from the points of intersection an auxiliary path;

ground path deter mining unit that determines from said auxiliary path, a turn at each of said intersection points, and generates from each of the determined turns said aircraft ground path; and ground path communication unit that provides the aircraft ground path to at least one user system.

* * * * *